(12) United States Patent
Kim (10) Patent No.: US 12,285,697 B2
(45) Date of Patent: Apr. 29, 2025

(54) MULTI-SHOOTING GAME MACHINE

(71) Applicant: NEXCADE CO., LTD., Seoul (KR)

(72) Inventor: Yong Hwan Kim, Goyang-si (KR)

(73) Assignee: NEXCADE CO., LTD., Seoul (KR)

( * ) Notice: Subject to any disclaimer, the term of this patent is extended or adjusted under 35 U.S.C. 154(b) by 0 days.

(21) Appl. No.: 17/907,622

(22) PCT Filed: May 10, 2022

(86) PCT No.: PCT/KR2022/006684
§ 371 (c)(1),
(2) Date: Sep. 28, 2022

(87) PCT Pub. No.: WO2022/265228
PCT Pub. Date: Dec. 22, 2022

(65) Prior Publication Data
US 2024/0207745 A1 Jun. 27, 2024

(30) Foreign Application Priority Data
Jun. 15, 2021 (KR) .......................... 10-2021-0077638

(51) Int. Cl.
*A63F 13/843* (2014.01)
*A63F 13/23* (2014.01)
(Continued)

(52) U.S. Cl.
CPC ............ *A63F 13/843* (2014.09); *A63F 13/23* (2014.09); *A63F 13/46* (2014.09); *A63F 13/52* (2014.09);
(Continued)

(58) Field of Classification Search
CPC ....... A63F 13/843; A63F 13/52; A63F 13/837
See application file for complete search history.

(56) References Cited

U.S. PATENT DOCUMENTS

2011/0034239 A1* 2/2011 Collette .............. G07F 17/3283
463/26
2014/0179392 A1* 6/2014 Post .................... G07F 17/3276
463/16
(Continued)

FOREIGN PATENT DOCUMENTS

| KR | 10-1227693 B1 | 1/2013 |
| KR | 10-1715888 B1 | 3/2017 |
| KR | 10-2018-0134269 A | 12/2018 |

OTHER PUBLICATIONS

Authorized Officer from the Korean Intellectual Property Office, International Search Report dated Aug. 11, 2022 for International Application No. PCT/KR2022/006684, 3 pages.
(Continued)

*Primary Examiner* — James S. McClellan
(74) *Attorney, Agent, or Firm* — MH2 TECHNOLOGY LAW GROUP, LLP (57) ABSTRACT

A multi-shooting game machine is disclosed. According to the invention, the multi-shooting game machine is configured to include: a central monitor; a control unit that controls characters having different shapes from each other such that the characters are displayed on the central monitor at set times; and three or more game controllers, each of which has a shooting muzzle, a small monitor, and a shoot button for each player at a side of the central monitor. The small monitor displays a target setting screen on which one or more characters that appear on the central monitor can be set as targets. When a character is set as a target, a line is connected between the shooting muzzle and the corresponding character, and only the character connected by the line is hit by the shoot button. According to this configuration, the multi-shooting game machine has an effect of enjoying a fishing game in various ways.

8 Claims, 3 Drawing Sheets

(51) Int. Cl.
  *A63F 13/46* (2014.01)
  *A63F 13/52* (2014.01)
  *A63F 13/5372* (2014.01)
  *A63F 13/837* (2014.01)

(52) U.S. Cl.
  CPC ........ *A63F 13/5372* (2014.09); *A63F 13/837* (2014.09)

(56) References Cited

U.S. PATENT DOCUMENTS

| | | | |
|---|---|---|---|
| 2016/0247347 A1* | 8/2016 | Peera | A63F 1/062 |
| 2023/0249075 A1* | 8/2023 | Hsu | A63F 13/40 463/2 |

OTHER PUBLICATIONS

Dongwook Koh, YouTube video clip, located at <URL:https://www.youtube.com/watch?v=0FCEMdTISXM>, uploaded Dec. 7, 2015.
Madmaxdrj, YouTube video clip, "How to play Fish Game 2021(for beginner)" located at <URL:https://www.youtube.com/watch?v=UTkJrsoGpT4>, uploaded Mar. 23, 2021.

* cited by examiner

MULTI-SHOOTING GAME MACHINE

CROSS-REFERENCE TO RELATED APPLICATIONS

This application is a U.S. National Stage application of PCT/KR2022/006684 filed 10 May 2022, which claims priority to Korean Patent Application No. 10-2021-0077638 filed on 15 Jun. 2021, the entire disclosures of which are herein incorporated by reference.

TECHNICAL FIELD

The present invention relates to a shooting game machine, particularly, to a multi-shooting game machine that can stimulate interest in game by displaying an accumulated won score on a credit window, when a character is won by a bullet or a shell shot at characters having various shapes which appear on a screen and disappear therefrom.

BACKGROUND ART

In general, since a person who wants to enjoy fishing has to prepare various heavy and expensive fishing tackles including a fishing rod, a paste bait, a landing net, and the like and has to travel a considerable distance for a considerable time from a city to a river, a lake, or the sea, such temporal and spatial constraints and economic burdens restrict the fishing from being invigorated by many people even though people who want to enjoy fishing are increased.

In addition, when a member of a fishing club enjoys actual fishing, the paste bait used has a significant adverse effect on the water quality, and immoderate capture of fish results in problems of severe depletion of fish resources and ecosystem disturbance.

In order to solve these problems, recently, there has been provided a screen fishing system that simply provides an indoor fishing environment similar to the real fishing environment to enjoy fishing without actual travel to outdoor facilities.

The screen fishing is a game in which a fish-like character appears on a screen, encounters a bait (float) while moving freely, and then bites based on a unique bite rate of a fish species to which the fish-like character belongs, and a user takes action to catch the fish-like character.

In the fishing system of the related art, a user casts a float freely and then takes action when fish randomly selected based on bite rate bites at bait, and thereby the fishing process proceeds to a fighting step.

Further, the user pulls the fish through the reeling of controlling a reel in the fighting step and receives an advantage or a penalty depending on whether fighting is successfully performed, and the fishing is ended when the fish is pulled completely.

However, in the game, it is not only difficult to control the reeling, but also very difficult to cause actual action to be taken for the reeling.

In addition, the screen fishing enables only one player to play fishing, and thus there is a demand for a game that can invigorate interest in the game through competition between players while several players participate in the game simultaneously and have fun at communication to each other.

SUMMARY OF INVENTION

Technical Problem

An object of the invention to solve the problems is to provide a multi-shooting game machine that enables several people to simultaneously enjoy playing a fishing game at one table.

In addition, another object of the invention is to provide a multi-shooting game machine that enables characters swimming on a screen to be shot and hit using a shooter.

In addition, still another object of the invention is to provide a multi-shooting game machine that enables characters swimming on a screen to be connected by a line and be set as a target.

In addition, still another object of the invention is to provide a multi-shooting game machine that enables a target to be set using a target setting screen on a small monitor.

Further, still another object of the invention is to provide a multi-shooting game machine that enables betting to be easily made using a betting screen on a small monitor.

Solution to Problem

According to an embodiment of the invention to solve the objects, there is provided a multi-shooting game machine including: a central monitor; a control unit that controls three or more characters having different shapes and different scale factors from each other such that the characters appear at one side of the central monitor and disappear at the other side at set times; and three or more game controllers, each of which displays a shooting muzzle at a side of the central monitor and includes a small monitor at an exterior side of the central monitor and a shoot button for shooting any one of a bullet, a shell, or a weapon at the small monitor or at an exterior side of the small monitor, for each player.

When a character hit by any one of a bullet, a shell, or a weapon shot from the shooting muzzle is won, the control unit displays an accumulated won score on a credit window, the won score being calculated by multiplying a betting amount of the shot bullet, shell, or weapon by a scale factor of the won character.

The small monitor displays a target setting screen on which one or more characters that appear on the central monitor are displayed and a displayed character can be set as a target. When a character displayed on the target setting screen is clicked to be set as a target, a line is connected between the shooting muzzle and a corresponding character which are displayed on the central monitor, and only the character connected by the line is hit by any one of a bullet, a shell, or a weapon when the shoot button is pressed.

Each of the game controllers is configured to cause a character closest to the shooting muzzle to be first hit among characters displayed on a path through which any one of a bullet, a shell, or a weapon moves on the central monitor when any one of the bullet, the shell, or the weapon is shot without connection of a line between the shooting muzzle and a character, and when the character is not hit, to cause the bullet, the shell, or the weapon to be reflected from a wall surface of the central monitor and be reflected until any other character is hit, to cause a line connected between the shooting muzzle and a character to be automatically removed when the corresponding character is won or exits from the central monitor, and to shoot any one of a bullet, a shell, or a weapon at a character which appears on the central monitor.

Further, according to another embodiment of the invention to achieve the object, there is provided another multi-shooting game machine including: a central monitor; a control unit that controls three or more characters having different shapes and different scale factors from each other such that the characters appear at one side of the central monitor and disappear at the other side at set times; three or more game controllers, each of which displays a shooting muzzle at a side of the central monitor and includes a small monitor at an exterior side of the central monitor and a shoot button for shooting any one of a bullet, a shell, or a weapon at the small monitor or at an exterior side of the small monitor, for each player; and a betting amount selecting screen that displays three or more betting amount buttons at a side of the small monitor and displays a selected betting amount around the shooting muzzle or a corresponding game controller when "one" betting amount button is selected.

The control unit causes any one of a bullet, a shell, or a weapon to be shot depending on a betting amount selected on the betting amount selecting screen. When a character is hit, the control unit displays an accumulated won score on a credit window, the won score being calculated by multiplying a betting amount of any one of the shot bullet, shell, or weapon by a scale factor of the won character.

Each of the game controllers is configured to cause a character closest to the shooting muzzle to be first hit among characters displayed on a path through which any one of a bullet, a shell, or a weapon moves on the central monitor when any one of the bullet, the shell, or the weapon is shot without connection of a line between the shooting muzzle and a character, and when the character is not hit, to cause the bullet, the shell, or the weapon to be reflected from a wall surface of the central monitor and be reflected until any other character is hit, to cause a line connected between the shooting muzzle and a character to be automatically removed when the corresponding character is won or exits from the central monitor, and to shoot any one of a bullet, a shell, or a weapon at a character which appears on the central monitor.

Advantageous Effects of Invention

Consequently, according to the multi-shooting game machine of the invention, since several people play a fishing game at one table simultaneously, interest in the game can be further added while the players compete against each other, and thus the invention has an effect of enabling the fishing game to be enjoyed in various ways.

In addition, according to the multi-shooting game machine of the invention, since comparison between scores acquired by setting characters swimming on a screen as targets and hitting the characters within limited periods of time can lead to competition, the invention has an effect of enabling users from various classes to enjoy the game only with scores of hitting without physical restrictions.

In addition, according to the multi-shooting game machine of the invention, since, among multiple characters swimming on the central monitor, a character set as a target is connected to the shooting muzzle by a line, the invention has an effect of enabling the character set as the target to be easily identified.

Further, according to the multi-shooting game machine of the invention, since a player can easily take part in betting on a separate betting amount setting screen, inconveniences of setting a betting amount can be relieved, and thus the invention has an effect of enabling the player to concentrate only on the game.

DESCRIPTION OF EMBODIMENTS

A term or word used in this specification or claims is not construed in a limited meaning of a common or dictionary meaning but has to be construed in a meaning and a concept in accordance with technical ideas of the invention based on the principle that an inventor can appropriately define a concept of a term in order to describe his or her invention in the best way.

In the entire specification, when a certain part "comprises" a certain configurational element, this doesn't mean that another configurational element is excluded but the other configurational element can be further included unless specifically described otherwise. In addition, a term of "unit", "machine", "module", "apparatus" or the like described in the specification means a basic unit that executes at least one of a function or an operation, and an element assigned with the term can be implemented in a combination of types of hardware and/or software.

In the entire specification, the word "and/or" has to be construed to include all combinations that can be provided by one or more related items. For example, a meaning of "a first item, a second item, and/or a third item" includes all combinations that can be provided by two or more items of the first, second, and third items, as well as the first, second, or third item.

Hereinafter, an embodiment of the invention will be described with reference to the figures.

Figure 1:
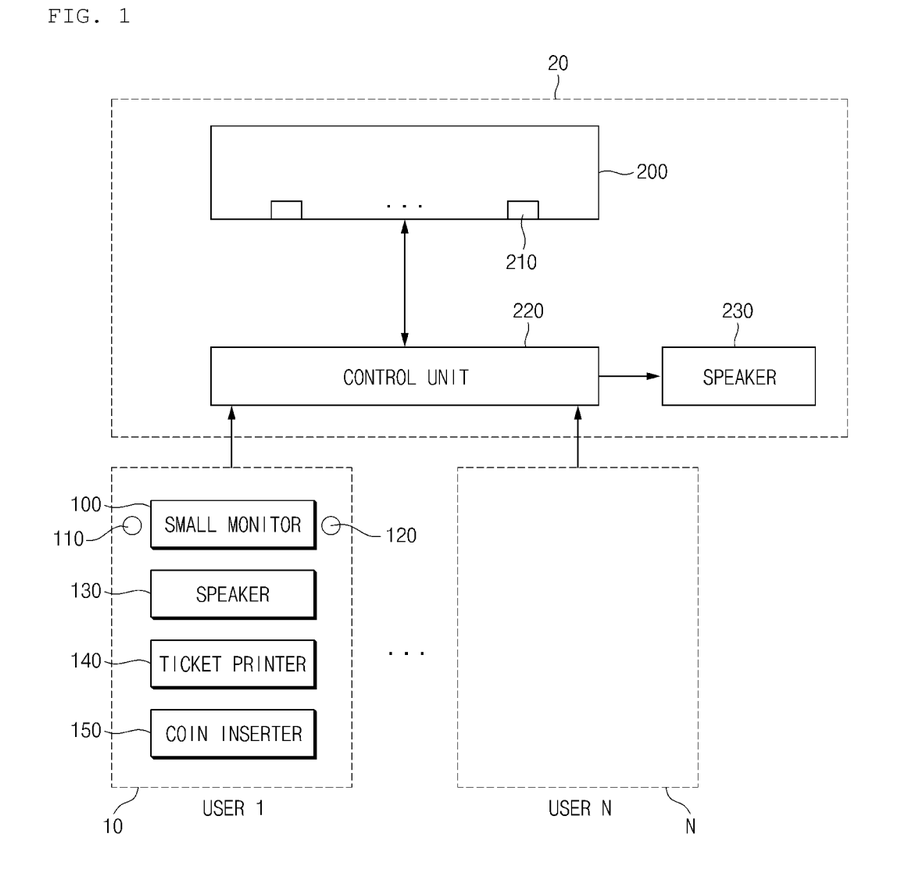
FIG. 1 is a diagram illustrating a main configuration of a multi-shooting game machine according to an embodiment of the invention.
Figure 2:
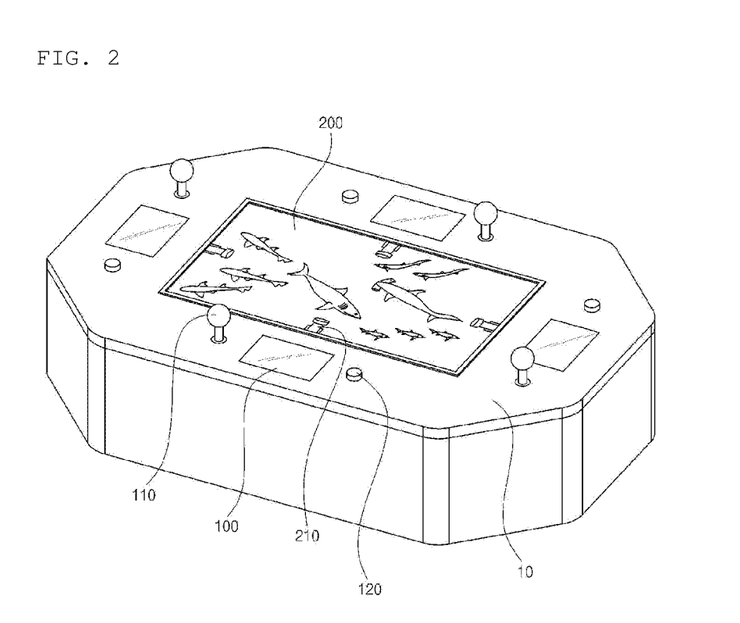
FIG. 2 is an external perspective view illustrating the multi-shooting game machine according to the embodiment of the invention.

FIG. 1 is a diagram illustrating a main configuration of a multi-shooting game machine according to the embodiment of the invention, and FIG. 2 is an external perspective view illustrating the multi-shooting game machine according to the embodiment of the invention.

As illustrated in FIGS. 1 and 2, the multi-shooting game machine of the invention is configured to include a central controller 20, which has a central monitor 200 on one table 300 and a control unit 220 that controls movement of a character which appears on the central monitor 200 and disappears therefrom, and multiple game controllers 10 which can be assigned to respective individual users to control a game.

In addition, the central controller 20 can include multiple speakers 230 having an amplifier function.

The central monitor 200 is provided at the center of the table and is configured of a display window which displays a character swimming in a virtual 3D space, and a shooting muzzle 210 that shoots any one of a bullet, a shell, or a weapon is provided at a side of the central monitor for each player.

The weapon is a collective term for ahead-throwing tools other than a bullet or a shell and includes an ahead-throwing tool such as an arrow, a spear, or a piece of stone.

The control unit 220 controls three or more characters having different shapes and different scale factors from each other on the central monitor 200 such that the characters appear at one side of a display and disappear at the other side thereof at set times.

In addition, when a character is hit and won by any one of a bullet, a shell, or a weapon shot from the shooting muzzle 210, the control unit 220 operates to display an accumulated won score on a credit window, the won score being calculated by multiplying a betting amount of any one of the shot bullet, shell, or weapon by a scale factor of the won character.

That is, the control unit 220 calculates the won score by multiplying a betting amount set for any one of a bullet, a shell, or a weapon by a scale factor assigned for each won character and displays the calculated won score on the credit window.

The credit window is displayed for each player in the vicinity of the shooting muzzle 210 of the central monitor 200.

The game controllers 10 are game control devices that are each assigned for each player around the central monitor 200 and are each configured of all of the related control devices used for game operations for each player, and three or more game controllers are provided at the table 300 such that several players can simultaneously play a game.

In this respect, each of the game controllers 10 can have, for each player, the shooting muzzle 210 displayed on the central monitor 200, a small monitor 100 provided at an exterior surface of the credit window for each player, a joystick 160 which sets any one of characters swimming on the central monitor 200 as a target by connecting a line to the character or adjusts an orientation of the shooting muzzle 210, and a shoot button 170 which is provided at a position separated from the joystick 160 and shoots any one of a bullet, a shell, or a weapon.

The joystick 160 can set a target by moving a target point upward or downward. When a target is set, a line is connected between the shooting muzzle 210 of each player and a character set as the target displayed on the central monitor 200 such that the character can be displayed as the set target.

With reference to FIG. 2, it can be confirmed that the central monitor 200 is provided at the center of the single table 300 having an approximately oval shape, and the small monitor 100, the joysticks 160, and the shoot button 170 are assigned to each of four players.

It is needless to say that the shooting muzzle 210 is provided on the central monitor 200, for each player.

In addition, the game controller 10 can have a coin inserter 150 which needs to be provided for a common game, a ticket printer 140 which can print a won or remaining ticket, and a speaker 130 which provides a voice used for guiding the game or a voice used during coin insertion or ticket printing.

In addition, the game controller 10 operates to provide information used for playing the game to a screen of the small monitor 100 and transmit set information to the control unit 220.

Hereinafter, for the convenience of description, since data set in the game controllers is transmitted to the central controller and data set in the central controller is transmitted to the game controllers such that basically the data is automatically transmitted and received, the description that has to be repeated for each controller is to be omitted.

First, the small monitor 100 is configured to provide information used for setting and proceeding of the game to the GUI and be operated as a touch screen.

That is, the small monitor is configured of the touch screen such that the menu screen can be easily selected when menus are simply touched and various settings can be performed.

Figure 4:
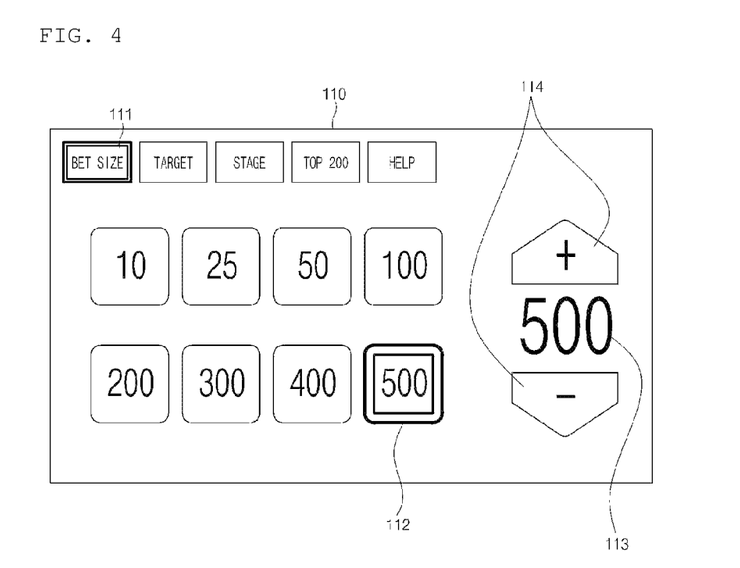
FIG. 4 is a view illustrating a menu screen and a betting amount setting screen of a small monitor.

With reference to a view illustrating the menu screen and a betting amount setting screen of the small monitor in FIG. 4, a menu screen 111, which displays buttons for enabling menus displayed on the small monitor to be selected, can be provided at a top of the screen. For example, a "BET SIZE" button is a button for providing a betting amount selecting screen on which betting can be made, a "TARGET" button is a button for providing a target setting screen on which a target can be set, and a "STAGE" button for displaying a stage of the game, a "TOP 200" button for displaying top ranking accumulated to a current time point, and a "HELP" button for providing information used for proceeding of the game are provided.

The control unit 220 can provide information of a won character by displaying a winning time of a won character and a bullet, a shell, or a weapon making a hit before winning the character for each stage at one side of the small monitor when the "STAGE" button of is pressed.

First, when the "BET SIZE" button on the menu screen 111 at the top is touched, a betting amount selecting screen 110 as illustrated in FIG. 4 is displayed, and the touched "BET SIZE" button is displayed as a selected button by being displayed differently from the unselected other menu buttons.

In the figure, the selected button is displayed by a double-lined rectangles to be distinguished from single-lined rectangles of the other buttons.

The betting amount selecting screen 110 is operated to display three or more betting amount setting buttons 112 which display different betting amounts from each other, select a betting sum displayed when a corresponding button is clicked as a betting amount, and shoot any one of a bullet, a shell, or a weapon depending on a clicked betting amount.

Buttons for enabling any one of "10, 25, 50, 100, 200, 300, 400, and 500" to be selected are displayed as the betting amount setting buttons 112 in FIG. 4. When any one thereof is selected, the selected button is displayed differently from the unselected buttons, a sum 113 displayed on the selected button is magnified to be displayed on a right screen of the small monitor, and increase and decrease keys 114 indicating "+ and −" for increasing and decreasing the displayed betting amount by "1" or more or "1" or less can be provided above and below the corresponding sum.

FIG. 4 illustrates a case where the "BET SIZE" button and the "500" button are selected, and the selected "BET SIZE" button and the "500" button are displayed by the double-lined rectangles to be distinguished from the other unselected buttons such that a player can easily notice a selected item.

It is needless to say that the display of selection can be performed using any method using flickering, a bold gothic font, a color or brightness difference, or the like, as well as the double-lined rectangle, as long as a selected button can be distinguished from the other unselected buttons.

In addition, the increase and decrease keys 114 indicating "+ and −" are described as an example of increasing and decreasing the amount by "1" or more or "1" or less;

however, another unit of increase and decrease can be set based on a selected amount of money.

For example, when the "10" button is pressed, an increase or decrease may be performed by +1, but in a range of "0 to 24". When the "25" button is pressed, an increase or decrease may be performed by +1, but in a range of "10 to 50".

In other words, the increase and decrease is performed based on a selected amount of money; however, selection is performed in a range of a lower amount indicated by one contiguous button to a higher amount indicated by the other contiguous button, and a unit of increase and decrease can be set by a user.

That is, when the "400" button is pressed, an increase or decrease is performed by +10, but in a range of 300 to 500".

Consequently, when a betting amount is selected on the betting amount selecting screen through the above-described method, the selected betting amount is transmitted to the control unit 220, and the control unit 220 causes any one of a bullet, a shell, or a weapon to be shot depending on the betting amount selected when input is performed by the shoot button 170. When a character is hit, the control unit displays an accumulated won score on a credit window, the won score being calculated by multiplying a betting amount of any one of the shot bullet, shell, or weapon by a scale factor of the won character.

Figure 5:
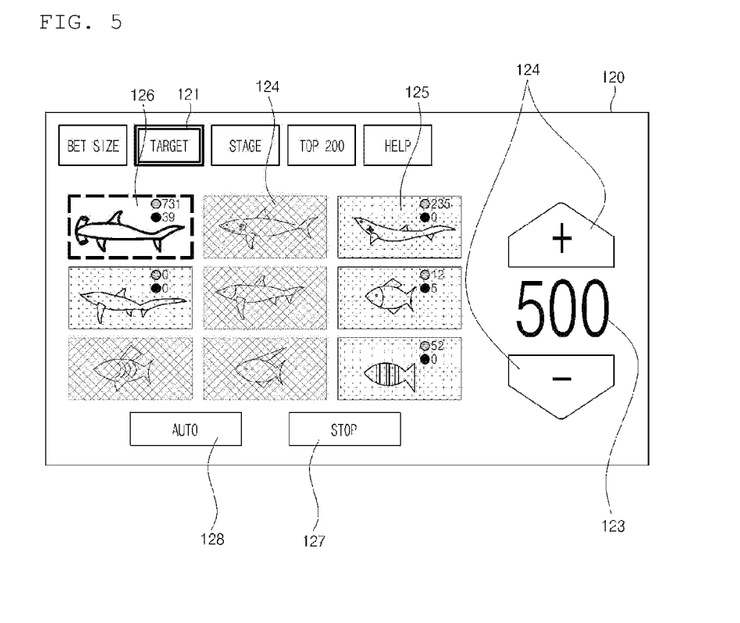
FIG. 5 is a view illustrating a target setting screen of the small monitor.

The target setting screen 120 is displayed as a target setting-related screen on the small monitor when the "TARGET" button 121 on the menu screen of the small monitor 100 is input.

With reference to a view illustrating the target setting screen of the small monitor in FIG. 5, when the "TARGET" button 121 on the menu screen 111 at the top is touched, the target setting screen as illustrated in FIG. 5 is displayed, and the touched "TARGET" button is displayed differently from the other menu buttons.

In addition, one or more characters 124, 125, and 126 which appear on the central monitor 200 are displayed on the target setting screen 120, and the displayed character is to be set as a target when the displayed character is touched.

When a character displayed on the target setting screen 120 is clicked, the control unit 220 operates to cause the corresponding character that appears on the central monitor to be set as a target, cause a line to be connected between the shooting muzzle 210 and the corresponding character displayed on the central monitor 200, and cause any one of a bullet, a shell, or a weapon to be shot so as to hit only the character connected by the line when input is performed by the shoot button 170.

In this respect, the target setting screen 120 displays all of the shapes of characters which can appear on the central monitor 200 and the scale factors set for the respective characters, and the characters which appear on the central monitor are displayed to be distinguished from characters which do not appear on the central monitor.

In addition, when a character displayed on the target setting screen 120 is set as a target, a character 126 set as a target is displayed differently from other characters which are not set as the target.

The character 126 set as the target means a character set as a target among characters 125 which appear on the central monitor.

With reference to FIG. 5, the character 126 set as the target, the characters 125 which are about to appear on the central monitor 200, and characters 124 which may appear on the central monitor are displayed differently from each other.

The characters 124 which may appear on the central monitor means characters which currently do not appear on the central monitor but may appear soon.

The distinguished display is illustrated as an example, and it is needless to say that any method can be used as long as the characters can be distinguished from each other.

For example, it is needless to say that the distinguished display can be performed using any method using a line, the flickering, a bold gothic font, a color or brightness difference, or the like as long as the buttons can be distinguished from each other.

It is preferable that, as the characters displayed on the target setting screen, all of the character 126 set as the target, the characters 125 which appear on the central monitor 200, and the characters 124 which may appear on the central monitor be displayed thereon. In addition, it is needless to say that the characters which are about to appear on the central monitor are separately displayed to give a hint of the characters to a player.

Figure 3:
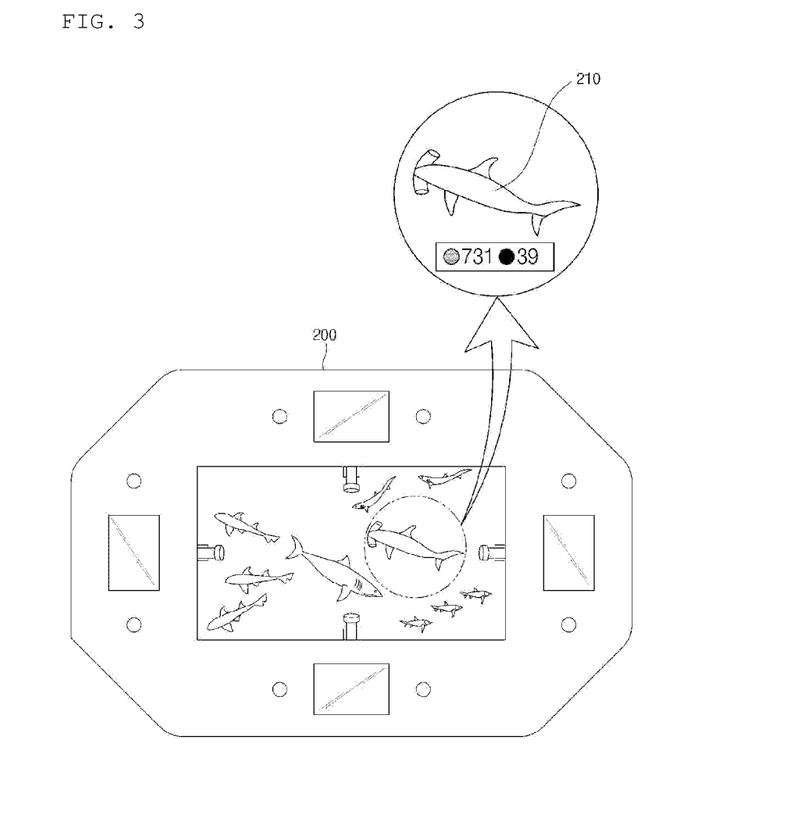
FIG. 3 is a view illustrating characters swimming on a central monitor.

On the other hand, numbers of any one or more of bullets, shells, or weapons which hit characters can be displayed together with the respective characters displayed on the central monitor 200 or the small monitor 100.

In addition, an AUTO button 128 for enabling any one of a bullet, a shell, or a weapon to be automatically shot is provided at the bottom of the target setting screen 120.

As described above, when a character displayed on the target setting screen is clicked to be set as a target, the shooting muzzle 210 and a corresponding character which are displayed on the central monitor 200 are connected by a line to display that the character is set as the target. Here, when the AUTO button 128, which is operated as an automatic shoot button, is activated in a state of setting the character as the target, any one of a bullet, a shell, or a weapon is automatically shot from the shooting muzzle 210 to hit the corresponding character even while the character connected by the line moves within the central monitor 200.

In addition, a "STOP" button 127 for enabling an automatic shooting function to be stopped is provided at the bottom of the target setting screen 120, and the automatic shooting function can be stopped by touching the "STOP" button when the automatic shooting function is desired to be stopped while the automatic shoot button is pressed to operate.

In the invention, when a target is set, as described above, the target can be set on the target setting screen; however, the target can be directly selected using the joystick 160.

When the target is selected using the joystick 160, the character set as the target and the shooting muzzle 210 are connected to each other by a line. In this case, the target can be hit using the shoot button 170.

It is needless to say that, even when the target is set on the target setting screen 120, any one of a bullet, a shell, or a weapon is shot at the target when the shoot button 170 is pressed.

Meanwhile, numbers of any one or more of bullets, shells, or weapons which hit characters during the game are displayed together with the respective characters displayed on the central monitor 200 or the small monitor 100.

With reference to FIG. 5, the small monitor 100 displays that the character 126 set as the target is hit by 731 bullets and 39 shells, one of the characters 125 which are about to appear on the central monitor is hit by 235 bullets and zero shells, another character thereof is hit by 12 bullets and five shells, and still another character thereof is hit by 52 bullets and zero shells.

With reference to a view illustrating characters swimming on the central monitor in FIG. 3, it can be confirmed that the numbers of any one of bullets, shells, or weapons which make hits are displayed together with all of the characters swimming on the central monitor 200 and that 731 bullets and 39 shells were hit with reference to an enlarged view.

Meanwhile, a betting amount selected on the betting amount setting screen can be displayed at a side of the target setting screen 120, and ±buttons for enabling the corresponding betting amount to be increased or decreased can be provided such that the betting amount can be easily changed.

In FIG. 3, "500" as the sum 123 selected as the betting amount and the ±buttons 124 of increase and decrease provided above and below the sum can be found.

In addition, the game controller 10 can display the betting amount selecting screen 110 on the small monitor 100 and enables a player to easily set a target by changing to the target setting screen 120 when a betting amount is set.

For example, when a player starts a game, the game controller enables the betting amount selecting screen 110 to be displayed such that the betting is first selected and enables the target to be easily set by automatically changing to the target setting screen 120 when the betting amount is set, thereby enabling a series of processes to be automatically executed such that the game proceeds quickly.

In addition, the game controller 10 is operated to cause any one of a bullet, a shell, or a weapon to be shot using the shoot button 170 without connection of a line between the shooting muzzle 210 and a character. In this case, the game controller causes a character closest to the shooting muzzle 210 to be first hit among characters displayed on a path through which any one of a bullet, a shell, or a weapon moves when any one of the bullet, the shell, or the weapon is shot. Here, when the character is not hit, the game controller causes the bullet, the shell, or the weapon to be reflected from a wall surface of the central monitor 200 and be reflected until any other character is hit.

Additionally, the line connected from the shooting muzzle 210 to the character is automatically removed when the corresponding character is won or disappears. When a target is set by connecting a line between the shooting muzzle 210 and a character displayed on the central monitor 200 by moving the joystick 160 upward or downward toward the character desired to be set as the target of the characters displayed on the central monitor 200, the characters can be connected by a line in an appearing order on the central monitor 200 or in a reverse order of latest appearing on the central monitor.

That is, the joystick 160 is moved in a horizontal direction to change an orientation of the shooting muzzle in the horizontal direction, and then the joystick is moved in a vertical direction to set a target.

In addition, the invention has a configuration in which a character that appears on the central monitor can be simultaneously set as a target by all of the game controllers such that several players can simultaneously enjoy the game.

That is, all players can set the same character as a target simultaneously or sequentially, and thereby the game can be played in tension of competition of who hits the corresponding character.

In addition, when a character displayed on the central monitor 200 is connected by a line and then is hit and won by a shell, the control unit 220 can be configured to collect shells, which remain on a screen among shells shot at the won character connected by the line, back to the shooting muzzle.

In addition, when a character displayed on the central monitor 200 or the small monitor 100 is won, the control unit 220 displays "0" as the number of hits made by bullets, shells, or weapons together with the corresponding character to indicate the character is hit.

Further, the control unit 220 can calculate a winning probability by dividing a score of shooting by the won score for each player and then display the winning probability at one side of the small monitor 100.

As described above, the specific embodiments described in the invention are described in detail; however, it is obvious for those skilled in the art that it is possible to perform various modifications and changes within a scope of the technical ideas of the invention, and it is needless to say that the modifications and changes pertain to the accompanying claims.

INDUSTRIAL APPLICABILITY

The invention relates to an entertainment machine and can be used for purposes of promoting the entertainment industry, establishing a sound entertainment culture for people, developing the national economy, and improving the quality of cultural lives of people.

The invention claimed is:

1. A multi-shooting game machine comprising:
a central monitor;
a control unit that controls three or more characters having different shapes and different scale factors from each other such that the characters appear at one side of the central monitor and disappear at the other side at set times; and
three or more game controllers, each of which displays a shooting muzzle at a side of the central monitor and includes a small monitor at an exterior side of the central monitor and a shoot button for shooting any one of a bullet, a shell, or a weapon at the small monitor or at an exterior side of the small monitor, for each player,
wherein, when a character hit by any one of a bullet, a shell, or a weapon shot from the shooting muzzle is won, the control unit displays an accumulated won score on a credit window, the won score being calculated by multiplying a betting amount of the shot bullet, shell, or weapon by a scale factor of the won character,
wherein the small monitor displays a target setting screen on which one or more characters that appear on the central monitor are displayed to be distinguished as a character which has appeared on the central monitor and a character which has not appeared on the central monitor, and a displayed character can be set as a target,
wherein, when a character displayed on the target setting screen is clicked to be set as a target, a line is connected between the shooting muzzle and a corresponding character which are displayed on the central monitor, and only the character connected by the line is hit by any one of a bullet, a shell, or a weapon when the shoot button is pressed,
wherein each of the game controllers causes a character closest to the shooting muzzle to be first hit among characters displayed on a path through which any one of a bullet, a shell, or a weapon moves on the central monitor when any one of the bullet, the shell, or the weapon is shot without connection of a line between the shooting muzzle and a character, and when the character is not hit, each of the game controllers causes the bullet, the shell, or the weapon to be reflected from a wall surface of the central monitor and be reflected until any other character is hit, causes a line connected between the shooting muzzle and a character to be automatically removed when the corresponding character is won or exits from the central monitor, and shoots any one of a bullet, a shell, or a weapon at a character which appears on the central monitor, and wherein the number of bullets, shells, or weapons which make a hit is displayed together with each character displayed on the central monitor or the small monitor.

2. The multi-shooting game machine according to claim 1, wherein, when a character displayed on the central monitor or the small monitor is won, "0" is displayed as the number of hits made by bullets, shells, or weapons which is displayed together with the corresponding character.

3. A multi-shooting game machine comprising:

a central monitor;

a control unit that controls three or more characters having different shapes and different scale factors from each other such that the characters appear at one side of the central monitor and disappear at the other side at set times; and three or more game controllers, each of which displays a shooting muzzle at a side of the central monitor and includes a small monitor at an exterior side of the central monitor and a shoot button for shooting any one of a bullet, a shell, or a weapon at the small monitor or at an exterior side of the small monitor, for each player, wherein, when a character hit by any one of a bullet, a shell, or a weapon shot from the shooting muzzle is won, the control unit displays an accumulated won score on a credit window, the won score being calculated by multiplying a betting amount of the shot bullet, shell, or weapon by a scale factor of the won character, wherein the small monitor displays a target setting screen on which one or more characters that appear on the central monitor are displayed to be distinguished as a character which has appeared on the central monitor and a character which has not appeared on the central monitor, and a displayed character can be set as a target, wherein, when a character displayed on the target setting screen is clicked to be set as a target, a line is connected between the shooting muzzle and a corresponding character which are displayed on the central monitor, and only the character connected by the line is hit by any one of a bullet, a shell, or a weapon when the shoot button is pressed, wherein each of the game controllers causes a character closest to the shooting muzzle to be first hit among characters displayed on a path through which any one of a bullet, a shell, or a weapon moves on the central monitor when any one of the bullet, the shell, or the weapon is shot without connection of a line between the shooting muzzle and a character, and when the character is not hit, each of the game controllers causes the bullet, the shell, or the weapon to be reflected from a wall surface of the central monitor and be reflected until any other character is hit, causes a line connected between the shooting muzzle and a character to be automatically removed when the corresponding character is won or exits from the central monitor, and shoots any one of a bullet, a shell, or a weapon at a character which appears on the central monitor, and wherein an automatic shoot button is displayed at one side of the target setting screen, a line is connected between the shooting muzzle and a character which are displayed on the central monitor when a corresponding character displayed on the target setting screen is clicked to be set as a target, and any one of a bullet, a shell, or a weapon is automatically shot to make a hit only while the character connected by the line moves on the central monitor when the automatic shoot button is operated.

4. The multi-shooting game machine according to claim 3, wherein, when a character displayed on the central monitor is connected by a line and then is hit and won by a shell or a weapon, shells or weapons, which remain on a screen among shells or weapons shot at the won character connected by the line, is collected back to the shooting muzzle.

5. A multi-shooting game machine comprising:

a central monitor;

a control unit that controls three or more characters having different shapes and different scale factors from each other such that the characters appear at one side of the central monitor and disappear at the other side at set times; and three or more game controllers, each of which displays a shooting muzzle at a side of the central monitor and includes a small monitor at an exterior side of the central monitor and a shoot button for shooting any one of a bullet, a shell, or a weapon at the small monitor or at an exterior side of the small monitor, for each player, wherein, when a character hit by any one of a bullet, a shell, or a weapon shot from the shooting muzzle is won, the control unit displays an accumulated won score on a credit window, the won score being calculated by multiplying a betting amount of the shot bullet, shell, or weapon by a scale factor of the won character, wherein the small monitor displays a target setting screen on which one or more characters that appear on the central monitor are displayed to be distinguished as a character which has appeared on the central monitor and a character which has not appeared on the central monitor, and a displayed character can be set as a target, wherein, when a character displayed on the target setting screen is clicked to be set as a target, a line is connected between the shooting muzzle and a corresponding character which are displayed on the central monitor, and only the character connected by the line is hit by any one of a bullet, a shell, or a weapon when the shoot button is pressed, wherein each of the game controllers causes a character closest to the shooting muzzle to be first hit among characters displayed on a path through which any one of a bullet, a shell, or a weapon moves on the central monitor when any one of the bullet, the shell, or the weapon is shot without connection of a line between the shooting muzzle and a character, and when the character is not hit, each of the game controllers causes the bullet, the shell, or the weapon to be reflected from a wall surface of the central monitor and be reflected until any other character is hit, causes a line connected between the shooting muzzle and a character to be automatically removed when the corresponding character is won or exits from the central monitor, and shoots any one of a bullet, a shell, or a weapon at a character which appears on the central monitor, and wherein the small monitor includes a betting amount selecting screen that is operated to display three or more betting amount buttons which display different betting amounts from each other, select a betting sum displayed when a corresponding button is clicked as a betting amount, and shoot any one of a bullet, a shell, or a weapon depending on a selected betting amount.

6. The multi-shooting game machine according to claim 5, wherein a betting amount button selected on the betting amount selecting screen is displayed differently from unselected betting amount buttons.

7. The multi-shooting game machine according to claim 6, wherein the betting amount selecting screen further includes increase and decrease keys indicating "+ and for increasing and decreasing the selected betting amount by "1" or more or "1" or less.

8. The multi-shooting game machine according to claim 7, wherein, when a score on the credit window is recorded from "1" or less to "1" or more, the betting amount selecting screen is displayed on the small monitor.

* * * * *